Figure 1:
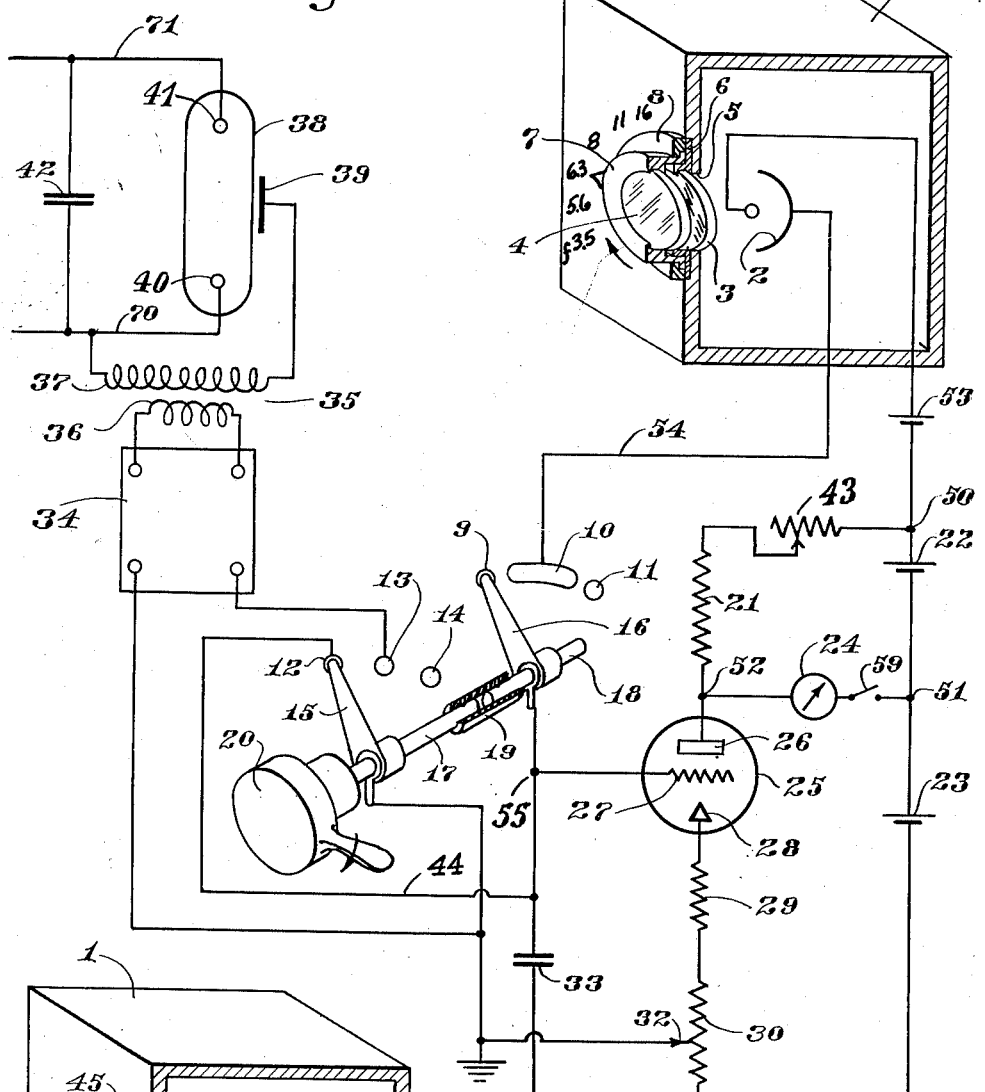

March 11, 1952  H. E. EDGERTON  2,588,368
LIGHT INTEGRATOR
Filed May 2, 1947  3 Sheets-Sheet 1

INVENTOR.
Harold E. Edgerton
BY
David Rines
ATTORNEY.

March 11, 1952    H. E. EDGERTON    2,588,368
LIGHT INTEGRATOR

Filed May 2, 1947      3 Sheets—Sheet 2

INVENTOR.
HAROLD E. EDGERTON
BY
David Rines
ATTY.

March 11, 1952  H. E. EDGERTON  2,588,368
LIGHT INTEGRATOR
Filed May 2, 1947  3 Sheets-Sheet 3

INVENTOR.
Harold E. Edgerton.
BY David Rines
ATTORNEY.

Patented Mar. 11, 1952

2,588,368

UNITED STATES PATENT OFFICE 2,588,368

LIGHT INTEGRATOR

Harold E. Edgerton, Belmont, Mass.

Application May 2, 1947, Serial No. 745,471

10 Claims. (Cl. 88—23)

The present invention relates to light integrators, and more particularly to apparatus for integrating the light produced by flashes of a flashtube. The present application is a continuation-in-part of application Serial No. 521,142, filed February 4, 1944.

Flashtubes have a nonuniform light-time characteristic. Time is required for the light of the flash to build up to its peak and, after the peak is reached, time is required for the light to become extinguished.

In connection with electric flashtubes of the type described in Letters Patent of the United States 2,408,764, issued October 8, 1946, to Harold E. Edgerton, for example, the total time, from the moment that the flash becomes initiated until, after the intensity reaches a maximum, the flash becomes extinguished, is exceedingly short. It may be less than $1/10{,}000$ of a second. In connection with flashtubes of other types, such as chemical flashtubes, however, the corresponding time is rather large, of the order of $1/50$ of a second.

The fastest-operating commercial camera shutters become reclosed within $1/400$ of a second after they become opened. Since flashtubes of the chemical type, on the other hand, remain illuminated for as long as $1/50$ of a second, much of the light thereof becomes lost. It is customary, in such cases, therefore, to synchronize the flash with the opening of the camera shutter, in order that the peak of the flash shall occur at the moment when the shutter is fully open. This wastes so much only of the light of the flash as occurs on both sides of the peak.

With electric flashtubes, however, the duration of the light of the flash is of the order of $1/10{,}000$ of a second or less. It is accordingly possible, even with the fastest-operating shutters, to utilize all the light of the flash, from the moment when the flash commences until the moment when the flash becomes completely extinguished.

For many purposes, it is desirable to know the total amount of the light of flashes of so brief duration. Light measurement of this character is of particular interest to color photographers, since color photography is exacting concerning the quantity of light required for the exposure.

The problem of determining the total amount of light produced by a light flash of this character is not easy of solution. Not only is the light of the flash of nonuniform intensity, varying from instant to instant throughout the duration of a flash, but also the duration of the flash itself varies with the type and the characteristics of the flashtube employed. This problem of measuring all the light of a variable-time, variable-intensity flash of exceedingly short duration has heretofore been solved only by tedious time-consuming processes that, moreover, cannot be availed of in connection with fleeting scenes that one may desire to photograph.

An object of the present invention, accordingly, is to provide a new and improved light integrator.

A further object is to provide a new and improved meter for integrating the light flux and to afford an indication of the total light flux the value of which is proportional to the photographic exposure.

Another object is to provide a new and improved aperture meter particularly designed for electric-flash photography.

Still another object is to provide a new and improved photoelectric light-integrating meter for measuring the short intense light pulses of an electric-flash photography light source.

A very important further object of the present invention is to provide new and improved apparatus for integrating the total amount of light produced by a light flash of nonuniform intensity and extremely short duration, such as is produced by the discharge of a gaseous-discharge flashlamp of the nature disclosed in the said Letters Patent 2,408,764, from the moment that the light flash becomes initiated until, after its intensity reaches a maximum, the light flash becomes completely extinguished. The invention is applicable also, however, to the integration of the light produced by nonuniform-intensity light flashes the duration of the flash of which is not so short.

Other and further objects will be explained hereinafter and will be particularly pointed out in the appended claims.

Figure 2:
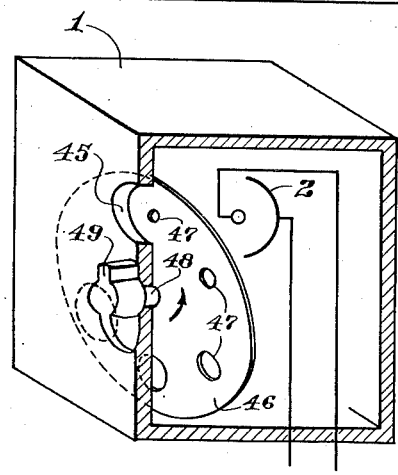
Figure 3:
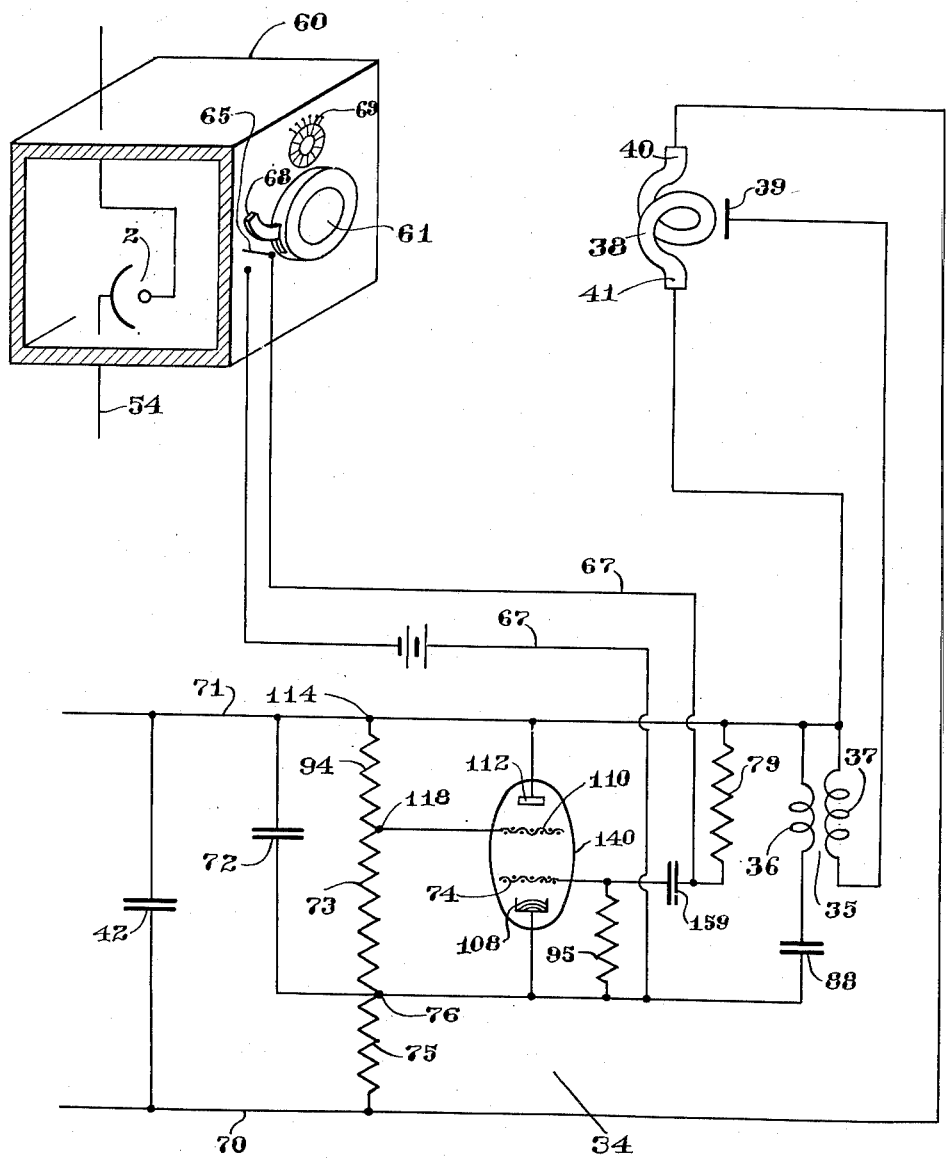
Figure 4:
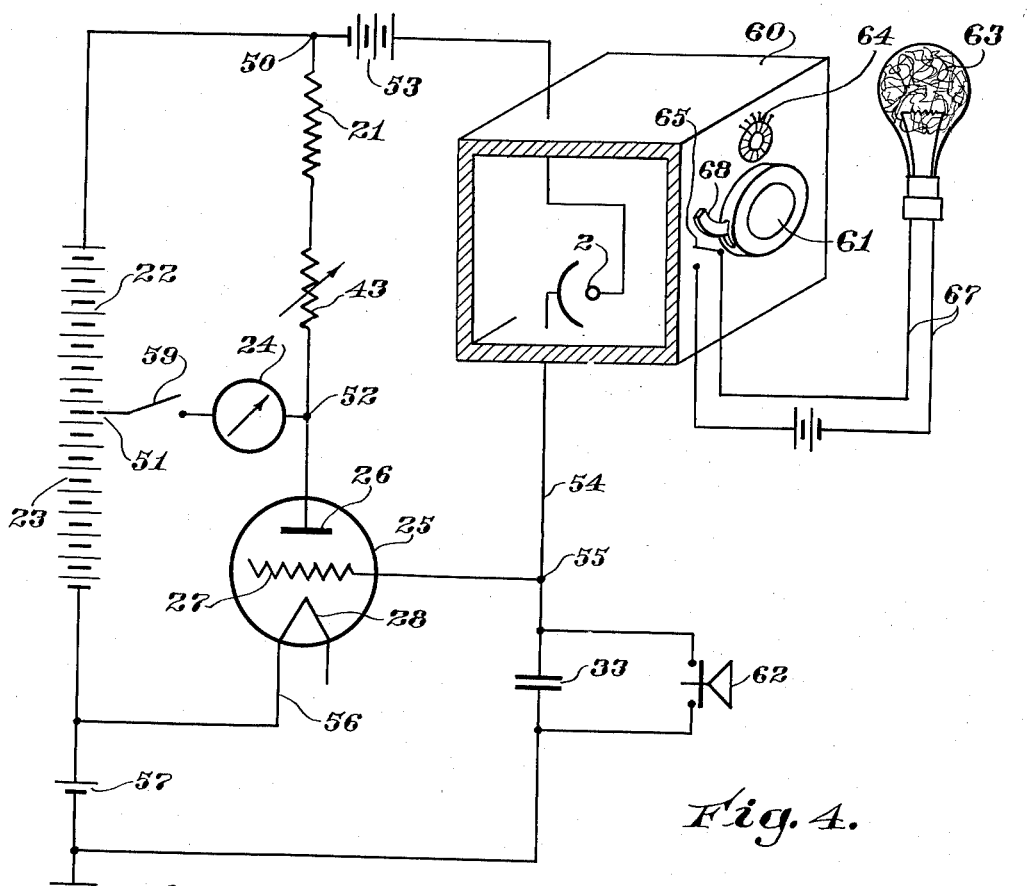

The invention will now be more fully described in connection with the accompanying drawings, in which Fig. 1 is a diagrammatic view of circuits and apparatus embodying the invention in preferred form, and illustrating its use in integrating the light from an electric flashtube of the character disclosed in the said Letters Patent 2,408,764; Fig. 2 is a fragmentary view of a modification; Fig. 3 is a view similar to Fig. 1 showing the photo-electric cell in a light-tight container, and showing also details of the control circuit diagrammatically illustrated in Fig. 1, but omitting the light-integrating circuits; Fig. 4 is a view similar to Fig. 1, but showing the photo-electric cell in the light-tight container of Fig. 3, and illustrating the application of the invention to integrating the light of a flashbulb of different nature from that illustrated in Figs. 1 and 3; and Fig. 5 is a graph illustrating the light-time characteristic of the photo-flashbulb shown in Fig. 4.

Figure 5:
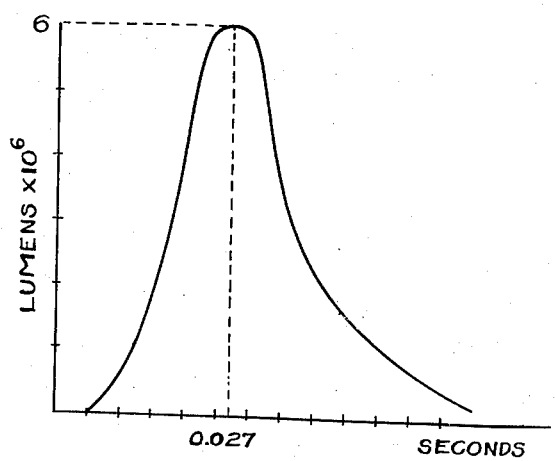

Photo-flashbulbs 63 of the nature disclosed in Fig. 4, as is well known, have a characteristic-light curve of the general nature illustrated in Fig. 5. An interval of some thousandths of a second may elapse from the moment that the circuit 67 of the bulb 63 is closed until the bulb reaches the peak of its illumination, shown in Fig. 5 as corresponding to 6,000,000 lumens. In some types of flashbulbs, this time interval may be 0.019 second; in other types, it is larger. The characteristic curve shown in Fig. 2 corresponds to a time-delay interval of 0.027 second. During this time interval, whatever its duration, the light is not of uniform intensity throughout, but the intensity increases from zero to the maximum. After the peak of illumination has been attained, moreover, a further interval of time elapses before the intensity of the light decreases from its maximum to zero.

The characteristic light curve of a lamp of the character disclosed in the said Letters Patent, shown at 38, is of precisely the same nonuniform-intensity nature, except that, as before explained, the duration of the flash may be less than 1/10,000 of a second, instead of about 1/50 of a second.

The illustrated preferred embodiment of the invention comprises a vacuum-tube triode 25, shown provided with a cathode 28, a control electrode 27 and an anode 26. The cathode may be of any conventional type; it may, for example, be in the form of a filament heated by a battery or a transformer (not shown).

The triode 25 is shown in Fig. 1 connected into an input circuit extending from the cathode 28, through three cathode bias resistors 29, 30 and 31, connected in series, by way of a conductor 56, and through a series-connected, preferably mica, oil or polystyrene, integrating capacitor or condenser 33, which may be 0.1 microfarad, to a terminal 55 connected between the capacitor 33 and the control electrode 27. The resistors 29, 30 and 31 may be of 1,000, 5,000 and 1,000 ohms, respectively.

The triode 25 is shown in Fig. 1 connected also into an output circuit. The output circuit is illustrated as having several branches.

One branch extends from the cathode 28, through the series-connected resistors 29, 30 and 31, and a supply B-battery, shown as comprising two sections 23 and 22, to a terminal 50; and from the terminal 50, through an impedance, shown as a resistor 21, and a zero-adjusting impedance, which may be a resistor 43, to a terminal 52 connected between the resistor 21 and the anode 26. The battery sections 23 and 22, may, for example, each have a voltage of 45 volts, providing a total B-battery voltage of 90, positive with respect to the potential of the cathode 28. The resistor 21 may have a resistance of 100,000 or 200,000 ohms. The zero-adjusting impedance 43 may have a resistance of 50,000 ohms.

A second branch of the output circuit may be established by closing a switch 59. It extends from the cathode 28, through the series-connected resistors 29, 30 and 31 and the B-battery section 23, to the mid-point terminal 51 between B-battery sections 23 and 22, having a 45-volt potential and, through the switch 59 and an indicating milliammeter 24 of the vacuum-tube voltmeter, to the terminal 52, and from the terminal 52, to the anode 26. The B-battery section 23 will tend to cause current to flow in this second branch section, so as to send current through the milliammeter 24 of the vacuum-tube voltmeter in one direction.

The other B-battery section 22 will at the same time, however, tend to send current through the milliammeter 24 in the opposite direction in a third branch circuit extending from the said mid-point terminal 51, through the said other half-section 22 of the B-battery, the terminal 50, and the resistors 43 and 21, to the terminal 52; and from this terminal 52, through the milliammeter 24 and the switch 59, back to the midpoint terminal 51.

If the zero-adjusting resistor 43 is so adjusted that these opposing currents are equal, a balance will be established in the electric circuit extending between the terminals 51 and 52, through the switch 59 and the milliammeter 24. The milliammeter 24 will then furnish a zero reading. The second and third branches of the output circuit thus together constitute a kind of bridge having vertices of equal potential at the terminals 51 and 52.

The integrating condenser 33 is initially charged to a potential required for a proper zero balance of the meter 24. This is effected by adjusting a variable tap 32, shown grounded, of the resistor 30 at a time when an operable movable switch contact member 15, that is connected to the tap 32, occupies its initial illustrated zero position, in contact with a cooperating stationary contact member 12. In this initial position, the movable contact member 15 is connected, through the cooperating contact member 12, by way of a conductor 44, to the common terminal 55 of the capacitor 33 and the control electrode 27. This initial bias adjustment of the tap 32 serves also to adjust the circuit constants in order to set the initial reading of the meter 24 to zero. Execpt for the performance of this function, the stationary contact member 12 is inert.

The movable contact member 15 is mounted upon a shaft 17, rotatable by a knob 20, so as to engage also further stationary contact members 13 and 14. A shaft 18 is alined with the shaft 17, though insulated therefrom, so as to be rotated therewith. The shaft 18 carries a further movable switch contact member 16 that engages a stationary inert contact member 9 in its initial position, when the contact member 15 occupies its own initial position, and two further stationary contact members 10 and 11. The stationary contact member 11 which, like the contact member 14, is inert, corresponds to the "read" point.

The initially charged integrating capacitor 33 becomes increasingly charged in response to the photoelectric current as light continues to fall upon a photoelectric cell or other photographic device 2 during the operation of the switch 15.

The photoelectric cell 2 utilizes the connections extending from the terminal 50, through a further supply B-battery 53, which may also be of 45 volts; and, by way of a conductor 54, through the stationary contact member 10 and the movable switch contact member 16, to the common terminal 55 of the capacitor 33 and the control electrode 27. The function of the further B-battery 53 is to increase the voltage on the photoelectric cell 2, thereby to enable very large light intensities to produce a current through the cell 2 correspondingly large in proportion to the amount of light.

The photoelectric cell 2 is shown contained in a box container 1 having an opening or aperture 5 or 45. Normally, in the absence of a photoelectric current to the capacitor 33, the above-traced circuit containing the photoelectric cell 2 is inert. Under these normal conditions, no current flows in any of the branch circuits of the output circuit of the triode 25. Under suitable adjustments, as before described, the opposing currents through the milliammeter 24 balance, at this time, and the milliammeter 24 consequently reads zero. When, however, light impinges on the photoelectric cell 2, through the opening 5 or 45, a current is established through the photoelectric cell 2. This photoelectric current, assuming that the movable contact member 16 is in contact with the stationary contact member 10, charges the integrating capacitor 33 to a voltage which is the time integral of the current divided by the capacity. This voltage across the integrating condenser 33, of course, introduces a voltage change between the control electrode 27 and the cathode 28. The triode current becomes thus changed, resulting in destroying the balance of the currents in the normally balanced electric circuit between the bridge vertices 51 and 52 through the indicating milliammeter 24. This results in yielding a corresponding reading of the milliammeter 24, proportional to the quantity of light falling upon the photoelectric cell 2.

As before explained, a very important feature of the present invention is to provide a new and improved apparatus for integrating the total amount of light of a variable-time variable-intensity flash, such as is produced by the discharge from a flashtube of the character illustrated at 38, from the moment that the light flash becomes initiated until, after its intensity reaches a maximum, the light flash becomes completely extinguished. The flashtube 38 is shown provided with two terminals, constituted of a cathode 40 and an anode 41, respectively connected by conductors 70 and 71 to a condenser 42, charged from any suitable source of power, not shown, and a trigger-starting or control electrode 39. The flashtube is normally nonconducting, but the condenser 42 will discharge through it, between the cathode 40 and the anode 41, when it is rendered conducting, as described in the said Letters Patent 2,408,764, when tripped by a control circuit 34. When the movable contact member 15 is actuated from its initial position, in contact with the stationary contact member 12, to engage the stationary contact member 13, the control circuit 34 is caused to energize the primary winding 36 of a transformer 35, the secondary winding 37 of which is connected to the cathode 40 and the control electrode 39. The resulting high-voltage surge of the secondary winding 37 of the transformer 35 becomes thus applied to the trigger electrode 39 of the flashtube 38. This causes the gas in the flashtube 38 to ionize, permitting the condenser 42 to discharge through the flashtube 38, between its electrodes 40 and 41, producing a very brilliant flash of extremely short duration. When the condenser 42 is fully discharged, the flashtube 38 promptly extinguishes and the cycle is ready for repetition.

The light from the flashtube 38 will impinge upon the photoelectric cell 2 in the container 1 through the opening 5 or 45. The effect of this light upon the photoelectric cell 2 will vary, however, with time, from the moment that the flash of the flashtube 38 becomes initiated until the flash reaches its peak of illumination, and thereafter until the light is extinguished. The light from the flashtube 38, so long as it lasts, operates continuously upon the photoelectric cell 2, but the intensity of the light impinging on the photoelectric cell 2 varies from instant to instant. This results in a continuously variable current in the above-traced circuit containing the photoelectric cell 2, starting from zero, at the instant prior to the operation of the flashtube 38, when the contact member 16 leaves its initial illustrated position, in contact with the stationary contact member 9, to engage the contact member 10, thereafter rising to a maximum, and then returning to zero again. This variation of current is faithfully reproduced in the form of a variable current in the condenser 33.

The total amount of this variable current corresponds to the total amount of light from the flash passing through the aperture 5 or 45. This total amount of current is added up, or integrated, to produce a corresponding resulting potential across the integrating condenser 33. This resulting total potential, in turn, is correspondingly reflected in the current passing through the second branch circuit, including the ammeter 24. This additional current disturbs, by so much, the balance of the currents through the ammeter 24, as before explained, to produce a corresponding reading of the indicating milliammeter 24.

After the switch 16 has passed on to the "read" point 11, the integrating capacitor 33 will hold the charge accumulated during the flash, permitting the operator to note the reading of the milliammeter 24. The meter 24 will record the voltage without discharging the capacitor 33 at a rate that will interfere with the reading of the meter after the flash. The drift of the indicating meter 24 after the flash reading will depend upon the grid current of the vacuum tube 25, the leakage current of the phototube 2, and the leakage of the circuit. The drift may be rendered inappreciable by employing a sufficiently large capacitor 33, or the drift may be compensated for. The capacitance for an uncompensated circuit may be 0.5 microfarad when the meter drift is limited to less than full-scale deflection in about 30 seconds.

The reading of the milliammeter 24 may simply be noted, or recorded, or it may be otherwise utilized, as for control purposes.

This accomplished, the potential across the integrating condenser 33 is restored to its initial value when the switch contact member 15 returns to its initial position, in engagement with the stationary contact member 12. In this position, as before stated, the switch 15 becomes connected, through the contact member 12, by way of the conductor 44, to the terminal 55 between the capacitor 33 and the control electrode 27.

Though the enclosure of the photoelectric cell 2 in the box 1 ensures that no extraneous light shall reach the photoelectric cell 2 except through the opening 5 or 45, the protection that the box 1 provides against extraneous light is really not needed, except for extreme degrees of accuracy, in which event, as will be explained more fully hereinafter, the system shown in Fig. 3 or Fig. 4 may be employed. This is because the intensity of the light flash is very large compared with that of the extraneous light. Even what little disturbance the extraneous light may introduce is minimized, according to the present invention, however, by having the circuit of the photoelectric cell 2 normally open. This is effected through the contact member 16 being normally in contact with, not the contact member 10, but the inert contact member 11 at the time of the reading of the ammeter 24.

Upon rotating the shaft 17 clockwise, in the direction of the arrow, as by means of the knob 20, the contact member 15 will be moved out of contact with the contact member 12, and the contact member 16 out of contact with the contact member 9. As the contact member 10 is shown larger than the contact member 13, however, the contact member 16 will engage the contact member 10 before the contact member 15 will engage the contact member 13. The circuit of the photoelectric cell 2 will therefore become effective before the control circuit 34 becomes closed to energize the tripping electrode 39 through the transformer 35. The contact member 10 need not be quite so long as illustrated; it is sufficient if the circuit of the photoelectric cell 2 becomes closed just prior to the initiation of the flash of the flashtube 38 upon the closing of the contact members 15 and 13. With continued rotation of the knob 20 clockwise, in the direction of the arrow, the contact member 15 will become moved out of engagement with the contact member 13, to open the control circuit 34, thus to prevent another flash, before the contact member 16 moves out of engagement with the contact member 10. By the time that the contact member 16 becomes moved into engagement with the inert stationary contact member 11, the contact member 15 engages the inert stationary contact member 14. Continued rotation of the knob 20 clockwise will restore the engagement of the movable contact members 15 and 16 with their respective inert stationary contact members 12 and 9, as shown.

The contact members are shown diagrammatically only, for purposes of explanation. In practice, a push-button switch (not shown) may be employed, instead, operated by the knob 20. A single rapid push with the finger will flip the switch quickly from the initial position, corresponding to the illustrated position, to the final setting, corresponding to the position in which the switches 15 and 16 respectively engage the contact members 14 and 11. After the meter 24 has been read, the finger will be released, whereupon a spring (not shown) will return the push-button switch to the initial position.

The condenser 33 charges only during the period when the contact members 16 and 10 are in engagement. Though this period, as before stated, is longer than the period of engagement of the contact members 15 and 13, so as to ensure that the circuit of the photoelectric cell 2 shall remain closed throughout the period of the flash of the flashtube 38, it is nevertheless very short, as short as the manipulator of the knob 20 can make it by his manipulation. The condenser 33 charges, therefore, only during this very short period. At all other times, any stray light entering the container 1 through the opening 5 or 45 to impinge upon the photoelectric cell can produce no effect at all upon the integrating condenser 33. The container 1, as already stated, therefore, is really not necessary, except that it prevents the action of extraneous light upon the photoelectric cell 2 during the very brief periods just prior to the initiation of the light flash and just after the flash has become extinguished, as determined by the excess in length of the contact member 10 over the length of the contact member 13. The only effect that extraneous light can have during these very brief periods is that entering through the opening 5 or 45.

The peak current through the phototube 2 is a direct function of the integrating capacitance and the voltage required for full scale on the deflecting meter 24. The required phototube current for full-scale deflection, moreover, increases inversely as the duration of the flash. A short flash should be accompanied by a higher phototube voltage in order to produce a full-scale reading without error.

In order not to have too great a range of movement of the indicating needle of the meter 24, corresponding to extreme variations in intensity of flashtubes of different sizes and types, therefore, and in order to extend the range of the instrument, provision is made for adjusting the amount of light that is permitted to enter the container 1. According to the modification of Fig. 2, this result is attained by covering the opening 45 with a rotatable disc 46 provided with apertures 47 of different size, rotatable by means of a knob 49, in the direction of the arrow, to aline the openings of different size with the opening 45. The meter 24 is provided with different calibrations to correspond to the various openings 47. A suitable diffuser, not shown, may be interposed between the phototube 2 and the aperture 47 with which it is alined, to diffuse the entering light evenly over the cathode surface of the photosensitive device 2.

According to the preferred embodiment of the invention, however, illustrated in Fig. 1, the desired result is attained by means of light polarizers 3 and 4, relatively rotatable with respect to each other, in the direction of the arrow, in relatively rotatable annuli 6 and 7, held together by a flange 8. A pair of polaroid sheets rotatable with respect to each other used for this purpose produces the effect of a continuously variable aperture system that may be calibrated in relation to requirements for color photography. The same diffuser may be employed.

It is possible to calibrate the scale of the meter to read directly either in light units or "aperture" numbers, yielding the proper-size camera apertures to produce properly exposed photographs for the proper types of both color and black-and-white film. Guided by the reading of the scale of the meter 24, the photographer may adjust the camera aperture to the value indicated, or he may suitably modify the distance between the light and the object to be photographed. All this may be effected rapidly, without computation of any kind, since the reading on the meter 24 is proportional to the exposure. The aperture calibration may be marked on the polaroid-moving mechanism instead of on the meter scale, as shown near the pointer on the ring 7 by the numerals f3.5, 5.6, 6.3, 8, 11 and 16.

Details of the control circuit 34 are shown in Fig. 3. The condenser 42 is connected by the conductors 70 and 71 to a bleeder resistor 73, 94 in series with a bleeder resistor 75, and in parallel with the flashtube 38. A trigger tube 140 may be connected to a terminal 76 and is grounded to a terminal 114, at the ends of the bleeder resistor 73, 94, so as to be supplied with voltage therefrom. The primary winding 36 of the transformer 35 is also connected to the terminals 76 and 114, in series with a condenser 88. The trigger tube 140 may be a thyratron, or it may be of the type described in the said Letters Patent 2,408,764, provided with a solid cathode 108, connected to the terminal 76, an anode or plate 112, connected to the terminal 114, and one or more grids 74 and 110. An impedance 95 is connected between the cathode 108 and the grid 74, and the resistor 73 is connected between the cathode 108 and the grid 110, between the terminal 76 and a terminal 118. A condenser 72 is connected across the bleeder resistor 73, 94 between the terminals 76 and 114. An impedance 79, shown as a resistor, and a condenser 159 are series connected between the grid 74 and the anode 112.

In order to simplify the circuit connections, a simple photo-flashbulb 63 is illustrated in Fig. 4, shown connected into a trip circuit 67 that may be closed by a switch 65 under the control of the lever 68 that operates the shutter 61. The triode 25, as in the system of Fig. 1, is shown, in Fig. 4, connected into an input circuit extending from the cathode 28, by way of the conductor 56, through a biasing battery 57, shown grounded, and through the series-connected integrating capacitor 33, to the control electrode 27. The biasing battery 57 may apply a negative potential of three volts upon the grid to the cathode 28.

The negative-voltage bias impressed upon the control electrode 27 by the biasing battery 57 maintains the triode plate current at a normal value in the initial condition, when the integrating condenser 33 is normally uncharged. When a voltage exists across the capacitor 33, in response to light falling upon the photoelectric cell or other photoelectric device 2, however, the triode plate current shifts to a different value than the initial value.

As in the system of Fig. 1, the triode 25 of Fig. 4 is also shown connected into a three-branch output circuit.

One branch extends from the cathode 28, by way of the conductor 56, through the supply B-battery 23, 22 to the terminal 50; and from the terminal 50, through the resistors 21 and 43, to the terminal 52 that is connected to the anode 26. The second branch of the output circuit extends from the cathode 28, by way of the conductor 56, through the B-battery section 23, to the mid-point terminal 51, and through the switch 59 and the milliammeter 24, and the terminal 52, to the anode 26. The third branch circuit extends from the said mid-point terminal 51, through the B-battery half-section 22, the terminal 50, the resistors 21 and 43 and the terminal 52, through the milliammeter 24, back to the mid-point terminal 51. The photoelectric cell 2 utilizes the connections extending from the terminal 50, through the further supply B-battery 53 and, by way of the conductor 54, to the control electrode 27.

The photoelectric cell 2 is shown in Fig. 4 contained in a light-tight box container 60 having a shutter 61 under the control of a shutter lever 68. The light-tight box 60 may be employed, as before stated, where extreme accuracy is required. Normally, when the shutter 61 is closed, and in the absence of a photoelectric current to the capacitor 33, the circuit containing the photoelectric cell 2 is inert. Under these normal conditions, as in the system of Fig. 1, no current flows in any of the branch circuits of the output circuit of the triode 25. The opposing currents through the milliammeter 24 balance at this time, and the milliammeter reads zero, as before described.

When, however, light impinges on the photoelectric cell 2, through the shutter 61, a current is established through the photoelectric cell 2. This photoelectric current, as will be understood from the description of the operation of the system of Fig. 1, charges the integrating capacitor 33 to a voltage which is the time integral of the current divided by the capacity. This voltage across the integrating condenser 33 introduces a voltage change between the control electrode 27 and the cathode 28. The triode current becomes thus changed, as before explained, resulting in destroying the balance of the currents in the normally balanced electric circuit between the bridge vertices 51 and 52 through the indicating meter 24.

Since the same lever 68 that opens the shutter 61 closes the switch 65 to light the flashtube 63, the light from the flashtube 63 will impinge upon the photocell 2 in the container 60 through the open shutter 61. The effect of this light upon the photocell 2 will vary, however, with time, from the moment that the flash of the flashtube 63 becomes initiated until the flash reaches its peak of illumination, and thereafter until the light is extinguished. The light from the flashtube 63 operates continuously upon the photocell 2 so long as the shutter remains open, but the intensity of the light impinging on the photocell varies from instant to instant. This results in a continuously variable current in the circuit containing the photocell 2, starting from zero, when the switch 65 is first closed, rising to a maximum, and then returning to zero again. This variation of current is faithfully reproduced in the form of a variable current in the condenser 33.

The total amount of this variable current corresponds to the total amount of light from the flash passing through the shutter 61, and represented by the area under the curve of Fig. 5. This total amount of current is added up, or integrated, to produce a corresponding resulting potential across the integrating condenser 33, to produce, as before explained, a corresponding reading of the indicating milliammeter 24.

In the system of Fig. 4, the potential across the integrating condenser 33 may be restored to its initial value by means of a reset switch 62, shown as a push-button switch connected in parallel with the condenser 33.

In some cases, it may be desirable to record less than the total integrated effect of the flashtube light-source 63. It may be desired, for example, to work with only a predetermined portion near the peak, or near some other part of the characteristic curve shown in Fig. 5. All that is necessary, in order to attain that end, is suitably to adjust the shutter 61, as by means of a shutter-adjusting mechanism 64. The time of closing of the switch 65 by the shutter-opening lever 68 may also be adjusted by adjusting the position of this switch 65 relatively to the lever. The shutter may thus be adjusted to open or close at any desired point or points of the characteristic curve shown in Fig. 5, so that only that amount of light from the flashtube 63 shall pass through the shutter as is predetermined by the adjustments. In all cases, the reading of the milliammeter 24 will bear a correspondence to the total amount of light passing through the shutter 61 to the photoelectric cell 2.

The enclosure of the photocell 2 in the light-tight box 60 ensures that no extraneous light shall reach the photocell, and no light at all except that controlled by the opening of the shutter, as controlled by these adjustments.

As shown in Fig. 3, the switch 68 may control the flashing of the flashtube 38 through the control circuit 34. This may be effected, for example, by connecting one of the conductors of the trip circuit 67 of Fig. 4 to a point between the capacitor 159 and the resistor 79 and the other to the cathode 108. Upon the closing of the switch 65, the condenser 88 will discharge through the condenser-discharge circuit comprising the tube 140 and the primary winding 36 of the transformer 35. The resulting high-voltage surge of the secondary winding 37 of the transformer 35 will become thus applied to the trigger electrode 39 of the flashlamp 38, thereby to produce a flash through the flashtube 38 in the manner already described. The closing of the switch 65 of Fig. 3 therefore corresponds to the engagement of the contact member 15 with the contact member 13 of Fig. 1 to energize the control circuit 34.

The present invention therefore provides a means for obtaining the integrated light output over the entire flash time of a flash of short duration the light intensity and the time of flash of which may both be variable. That output, as indicated on the meter 24, represents the useful exposure of the light flash on a photographic film.

Further modifications will occur to persons skilled in the art and all such are considered to fall within the spirit and scope of the invention, as defined in the appended claims.

What is claimed is:

1. Light-integrating apparatus having, in combination and supported thereon in operative relationship, a container provided with an opening, a photosensitive device in the container upon which light may impinge through the opening, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received by the photosensitive device through the opening, means for adjusting the amount of light that may travel through the opening, and means for indicating the value of the charge integrated on the integrating condenser in accordance with the adjustment of the amount of light that may travel through the opening.

2. Apparatus for integrating the total amount of light produced by a light flash of nonuniform intensity and of short duration from the moment that the flash becomes initiated until, after the intensity reaches a maximum, the flash becomes completely extinguished, and for indicating the value of the integrated total, the said apparatus having, in combination, a light-tight container provided with a shutter, means controlled by the opening of the shutter for initiating the flash, a photosensitive device in the container upon which the light from the flash may impinge through the shutter when the shutter is open, means for integrating the total amount of light received from the flash by the device, and means for indicating the value of the integrated total.

3. Apparatus for integrating the total amount of light produced by a flashlamp flash of nonuniform intensity and of short duration from the moment that the flash becomes initiated until, after the intensity reaches a maximum, the flash becomes completely extinguished, and for indicating the value of the integrated total, the said apparatus having, in combination, a light-tight container provided with a shutter, an electric circuit for the flashlamp, means controlled by the opening of the shutter for controlling the circuit to cause the flashlamp to flash, whereby the flash becomes initiated at a time when the shutter is open, a photosensitive device in the container upon which the light from the flash may impinge through the shutter when the shutter is open, means for integrating the total amount of light received from the flash by the device, and means for indicating the value of the integrated total.

4. Apparatus for integrating the total amount of light produced by a flashtube flash of nonuniform intensity and of short duration from the moment that the flash becomes initiated until, after the intensity reaches a maximum, the flash becomes completely extinguished, and for indicating the value of the integrated total, having, in combination, a light-tight container provided with a shutter, an electric circuit for the flashtube, means controlled by the opening of the shutter for controlling the circuit to cause the flashtube to flash, whereby the flash becomes initiated at a time when the shutter is open, a photosensitive device in the container upon which the light from the flash may impinge through the shutter when the shutter is open, an integrating condenser, a photosensitive circuit in which the photosensitive device and the condenser are connected in order that the condenser may become charged in response to the action of the light from the flash upon the photosensitive device during all the time that the light is received from the flash by the device, an integrating circuit in which the condenser is connected for integrating the charge on the condenser, thereby to integrate the total amount of light received from the flash by the device, and a meter circuit connected to the integrating circuit for indicating the value of the integrated charge.

5. Apparatus as defined in claim 2 provided with means for adjusting the shutter to control the time during which the light from the flash is received by the photosensitive device.

6. Apparatus for integrating the total amount of light produced by a light flash of nonuniform intensity and of short duration and for indicating the value of the integrated total, the said apparatus having, in combination, and supported thereon in operative relationship, means for initiating the flash, a photosensitive device upon which the light from the flash may impinge, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received from the flash by the photosensitive device, and means for indicating the value of the charge integrated on the integrating condenser.

7. Apparatus for integrating the total amount of light produced by a light flash of nonuniform intensity and of short duration and for indicating the value of the integrated total, the said apparatus having, in combination, and supported thereon in operative relationship, a normally ineffective photosensitive device upon which light from the flash may impinge, means for initiating the flash and for rendering the photosensitive device effective, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received from the flash by the photosensitive device, and means for indicating the value of the charge integrated on the integrating condenser.

8. Apparatus for integrating the total amount of light produced by a light flash of nonuniform intensity and of short duration and for indicating the value of the integrated total, the said apparatus having, in combination, and supported thereon in operative relationship, a photosensitive device upon which the light from the flash may impinge, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received from the flash by the photosensitive device, the integrating condenser being normally disconnected from the photosensitive device in the circuit, means for initiating the flash and for connecting the integrating condenser to the photosensitive device in the circuit, and means for indicating the value of the charge integrated upon the integrating condenser.

9. Apparatus for integrating the total amount of light produced by a light flash of nonuniform intensity and of short duration and for indicating the value of the integrated total, the said apparatus having, in combination, and supported thereon in operative relationship, a photosensitive device upon which the light from the flash may inmpinge, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received from the flash by the photosensitive device, the integrating condenser being normally disconnected from the photosensitive device in the circuit, means for initiating the flash and for connecting the integrating condenser to the photosensitive device in the circuit and for thereafter disconnecting the condenser from the photosensitive device in the circuit, and means for indicating the value of the charge integrated upon the integrating condenser.

10. Apparatus for integrating the total amount of light produced by a light flash of nonuniform intensity and of short duration and for indicating the value of the integrated total, the said apparatus having, in combination, and supported thereon in operative relationship, a container provided with an opening, a photosensitive device in the container upon which the light from the flash may inmpinge through the opening, an integrating condenser of relatively large capacity, an integrating circuit containing the photosensitive device and the integrating condenser directly connected in series in order that the integrating condenser may become charged to a voltage that is the time integral of the current in the integrating circuit divided by the capacity, whereby the charge upon the integrating condenser is rendered proportional to the total amount of light received from the flash by the photosensitive device through the opening, means for adjusting the amount of light that may travel through the opening, and means for indicating the value of the charge integrated on the integrating condenser.

HAROLD E. EDGERTON.

REFERENCES CITED

The following references are of record in the file of this patent:

UNITED STATES PATENTS

| Number | Name | Date |
|---|---|---|
| 1,244,159 | Asdit | Oct. 23, 1917 |
| 2,149,250 | Bing | Mar. 7, 1939 |
| 2,156,440 | Veber | May 2, 1939 |
| 2,168,994 | Kelley | Aug. 8, 1939 |
| 2,172,220 | Orelup | Sept. 5, 1939 |
| 2,196,604 | Galter | Apr. 9, 1940 |
| 2,274,158 | Penther | Feb. 24, 1942 |
| 2,286,808 | Hutchison | June 16, 1942 |
| 2,293,425 | Dammond | Aug. 18, 1942 |
| 2,336,633 | Parson | Dec. 14, 1943 |
| 2,402,580 | Roters | June 25, 1946 |
| 2,419,978 | Wildman | May 6, 1947 |

OTHER REFERENCES

"A Method of Measuring the Maximum Intensity of Light from the Photoflash Lamps or From Other Sources of Short Duration," by W. E. Forsythe and M. A. Easley, Rev. Sci. Inst., 3, Sept. 1932, pages 488 to 492 inclusive.

"Testing Shutters with the Photo-Electric Cell," by Carleton Long and J. Blair in The Photographic Journal (London) for August 1934, pages 423 and 424.

"Characteristics of Photoflash Lamps," by W. M. Forsythe and M. A. Easley in Photo Technique, May 1940, pages 10 to 13 inclusive.

"Sensitiometric Study of Gaseous Condenser-Discharge Lamps," by Clifton Tuttle et al., Photo-Technique for September 1940, pages 52 to 57 inclusive.

"Photographic Use of Electrical Discharge Flashtubes," by Harold E. Edgerton in J. O. S. A. in vol. 36, No. 7, July 1946, pages 390 to 399 inclusive.